United States Patent
Tanna et al.

(10) Patent No.: US 8,768,167 B2
(45) Date of Patent: Jul. 1, 2014

(54) SYSTEM AND METHOD FOR AUTOMATED PROVISIONING OF SERVICES USING SINGLE STEP ROUTING AND WAVELENGTH ASSIGNMENT ALGORITHM IN DWDM NETWORKS

(75) Inventors: Harshad Tanna, Plainsboro, NJ (US); Sudha Ramesh, Moraga, CA (US); Ravi Vaidyanathan, Belle Mead, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 327 days.

(21) Appl. No.: 13/284,044

(22) Filed: Oct. 28, 2011

(65) Prior Publication Data

US 2012/0275789 A1 Nov. 1, 2012

Related U.S. Application Data

(60) Provisional application No. 61/480,644, filed on Apr. 29, 2011.

(51) Int. Cl.
*H04J 14/00* (2006.01)

(52) U.S. Cl.
USPC ............. 398/49; 398/45; 398/46; 398/47; 398/48; 398/50; 398/58; 398/175

(58) Field of Classification Search
USPC ............................................ 398/45–79
See application file for complete search history.

(56) References Cited

U.S. PATENT DOCUMENTS

| | | | |
|---|---|---|---|
| 7,013,084 B2 * | 3/2006 | Battou et al. | 398/45 |
| 7,020,394 B2 | 3/2006 | Zhang et al. | |
| 7,088,920 B2 | 8/2006 | Krishnaswamy et al. | |
| 7,162,632 B2 * | 1/2007 | Cao et al. | 713/163 |
| 7,362,974 B2 * | 4/2008 | De Patre et al. | 398/50 |
| 7,716,271 B1 | 5/2010 | Bertsekas et al. | |
| 7,769,290 B2 * | 8/2010 | Smith | 398/5 |
| 7,925,163 B2 * | 4/2011 | Segal | 398/69 |
| 2002/0145779 A1 | 10/2002 | Strasser et al. | |
| 2003/0035166 A1 * | 2/2003 | Zhang et al. | 359/118 |
| 2003/0099014 A1 * | 5/2003 | Egner et al. | 359/124 |
| 2004/0153492 A1 * | 8/2004 | Cao et al. | 709/200 |
| 2006/0188252 A1 * | 8/2006 | Schluter | 398/25 |

(Continued)

OTHER PUBLICATIONS

Zang, Hui et al., "A Review of Routing and Wavelength Assignment Approaches for Wavelength-Routed Optical WDM Networks," Optical Networks Magazine, vol. 1, pp. 47-60, Jan. 2000.

(Continued)

*Primary Examiner* — Li Liu
(74) *Attorney, Agent, or Firm* — Philip J. Feig

(57) ABSTRACT

A single step routing and wavelength assignment method and system for automated provisioning of services on DWDM networks is presented. This novel single step solution automates design and assignment of services in DWDM networks. For an automated provisioning platform that can handle the routing and wavelength assignment in a single step, the solution avoids reconfiguration of existing services. It also takes into consideration practical aspects of DWDM transponder availability at termination sites and regeneration sites along the selected route. The methodology includes iterative computation of common channel sets to avoid multiple shortest path computations for each of the wavelengths.

9 Claims, 14 Drawing Sheets

(56) References Cited

U.S. PATENT DOCUMENTS

| | | |
|---|---|---|
| 2008/0298805 A1* | 12/2008 | Lee et al. .................... 398/48 |
| 2009/0110402 A1* | 4/2009 | Bernstein et al. ............... 398/79 |
| 2010/0014859 A1* | 1/2010 | D'Alessandro et al. ........ 398/48 |
| 2010/0221003 A1 | 9/2010 | Bernstein et al. |
| 2010/0310251 A1 | 12/2010 | Smith |
| 2011/0008049 A1 | 1/2011 | Tanonaka et al. |
| 2011/0013911 A1 | 1/2011 | Alexander et al. |
| 2012/0213520 A1* | 8/2012 | Doverspike et al. ............ 398/79 |

OTHER PUBLICATIONS

International Application No. PCT/US2012/032894—PCT International Search Report dated Jun. 23, 2012.

Hui Zang, Jason P. Jue and Biswanath Mukherjee, "A Review of Routing and Wavelength Assignment Approaches for Wavelength-Routed Optical WDM Networks," Optical Networks Magazine, pp. 47-60, Jan. 2000.

* cited by examiner

SYSTEM AND METHOD FOR AUTOMATED PROVISIONING OF SERVICES USING SINGLE STEP ROUTING AND WAVELENGTH ASSIGNMENT ALGORITHM IN DWDM NETWORKS

CROSS REFERENCE TO RELATED APPLICATIONS

The present invention claims the benefit of U.S. provisional patent application 61/480,644 filed Apr. 29, 2011, the entire contents and disclosure of which are incorporated herein by reference as if fully set forth herein

FIELD OF THE INVENTION

This invention relates generally to dense wavelength division multiplexing (DWDM), automated service provisioning and operations support systems, and in particular to automation of provisioning of services in a DWDM network.

BACKGROUND OF THE INVENTION

Algorithms that deal with the problem of service routing and wavelength assignment for off-line optimization of network utilization can be found. For example, there is significant body of academic research for the problem of Routing and Wavelength Assignment (RWA) in DWDM networks. Most of this research focuses on optimizing the wavelength utilization throughout the network. These solutions typically have very high computational complexity. Due to the complexity of such algorithms, providers typically use separate service planning and service provisioning systems. In other words, one drawback with existing approaches is that they typically result in reconfiguration of already provisioned services. As a result, these algorithms are mostly used in offline planning systems.

One such approach uses multiple transformed network graphs for computation of route and wavelength assignment. This dynamic routing and wavelength assignment approach addresses the assignment problem but requires multiple passes for each of the candidate route paths. For example, if there are forty (40) wavelengths in a given DWDM network, forty such graphs would be generated and shortest path route computations would be iteratively carried out for all forty graphs.

As stated before, there has been academic research on the Routing and Wavelength Allocation topic. The RWA algorithms broadly fall into two categories: Static and Dynamic Static RWA algorithms try to globally optimize the wavelength assignments with objectives of maximizing the number of services on a given network. These algorithms are not suitable for situations where demands need to be provisioned on an ongoing basis with minimal or no reconfiguration for existing services.

For automated service provisioning purpose, these approaches fall short in the following aspects. The approaches require reconfiguration/re-provisioning of existing services, and require multiple passes over routing and wavelength selection process. Also, these approaches require working and protection path routing and wavelength assignments to be computed independently and the approaches do not handle regeneration node computations or pre-specification. This is not desirable in most situations.

SUMMARY OF THE INVENTION

A single step routing and wavelength assignment method for automated provisioning of services on DWDM networks is presented. This novel single step solution automates design and assignment of services in DWDM networks. For an automated provisioning platform that can handle the routing and wavelength assignment in a single step, the solution avoids reconfiguration of existing services. It also takes into consideration practical aspects of DWDM transponder availability at termination sites and regeneration sites along the selected route. The methodology includes iterative computation of common channel sets to avoid multiple shortest path computations for each of the wavelengths.

A system for automated provisioning of services using single set routing and wavelength assignment algorithm in DWDM networks comprises a CPU and a module operable to obtain a service request comprising at least a desired service and preferences, to perform a routing and wavelength assignment algorithm in accordance with a network and services inventory, to create the desired service in the inventory based on results of the routing and wavelength assignment algorithm, to process the desired service, and to activate the desired service in the DWDM network, the routing and wavelength assignment algorithm performed by computing an ordered list of shortest candidate routes, iterating over the ordered list of shortest candidate routes to assign resources along the first route that meets regeneration and OEO preferences by computing common wavelength sets using hierarchical pair-wise common channel set algorithm, computing required OEO regenerations, selecting optimal OEO regeneration nodes using rank order of the common channel sets, while considering availability of required transponder ports at the optimal OEO regeneration nodes, selecting wavelengths from common channel sets on route path sections, selecting termination and OEO node transponder ports, assigning selected wavelengths on the candidate route paths, assigning transponder ports, and updating the network and services inventory.

In one aspect, the preferences comprise at least one of network location, regeneration preferences, wavelength preferences and routing preferences. In one aspect, the resources are wavelengths (channels) and/or ports along the selected route.

A method for automated provisioning of services using single set routing and wavelength assignment algorithm in DWDM networks comprises obtaining a service request comprising at least a desired service and preferences, performing a routing and wavelength assignment algorithm in accordance with a network and services inventory, creating the desired service in the network and services inventory based on results of the routing algorithm, processing the desired service and activating the desired service in the DWDM network, said routing and wavelength assignment algorithm comprising steps of computing an ordered list of shortest candidate routes, iterating over the ordered list of shortest candidate routes to assign resources along the first route that meet regeneration and OEO preferences further comprising steps of computing common wavelength sets using hierarchical pair-wise common channel set algorithm, computing required OEO regenerations, selecting optimal OEO regeneration nodes using rank order of the common channel sets, while considering availability of required transponder ports at the optimal OEO regeneration nodes, selecting wavelengths from common channel sets on route path sections, selecting termination and OEO node transponder ports, assigning selected wavelengths on the candidate route paths, assigning transponder ports and updating the network and services inventory.

In one aspect, the preferences comprise at least one of network location, regeneration preferences, wavelength preferences and routing preferences. In one aspect, In one aspect, the resources are wavelengths (channels) and/or ports along the selected route.

A computer readable storage medium storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

A novel single step RWA algorithm that works with a database of network infrastructure and services is presented. In addition to performing the RWA in a single step, the inventive methodology also takes into consideration availability of DWDM transponders at service termination sites and regeneration sites to minimize the equipment cost. The algorithm is also aware of the protection requirement for the services. The system and method allows users to specify in advance one or more of the following: optical termination port (transponder port), route (list of optical links to be used), wavelength, and/or regeneration nodes.

Figure 1:
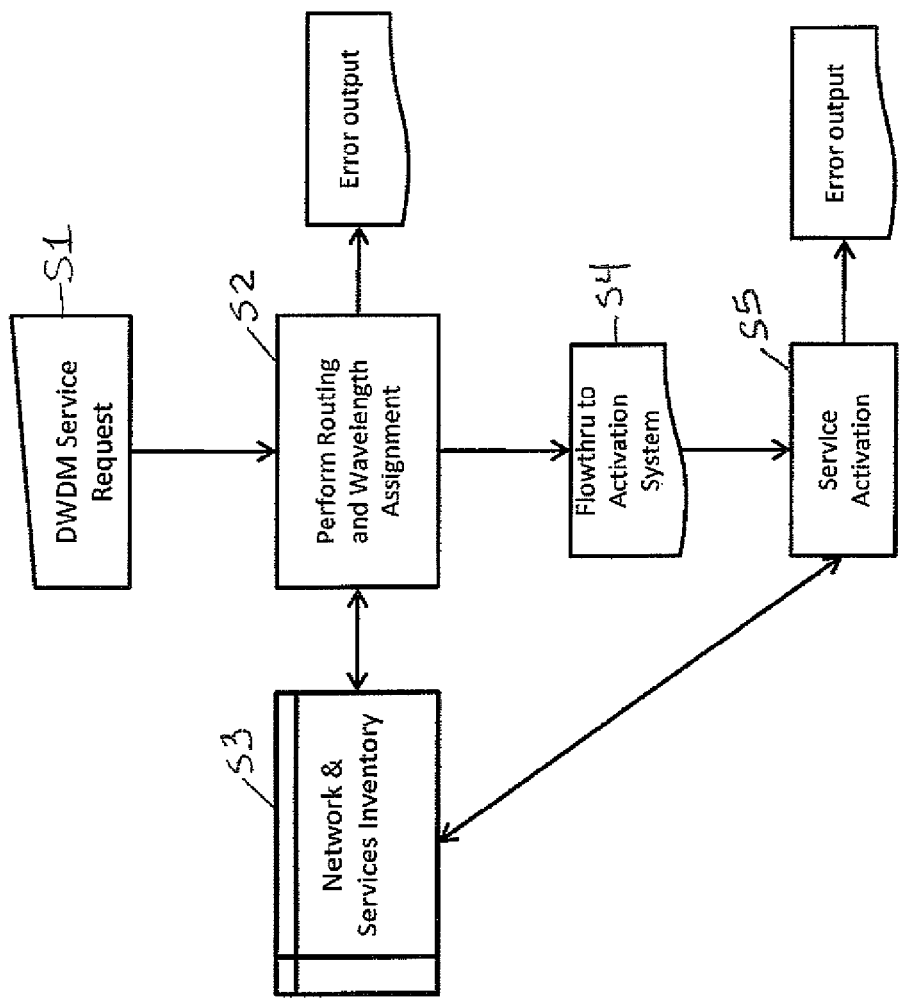
FIG. 1 illustrates a high level flow diagram of the automated service provisioning process.

FIG. 1 depicts a high level flow diagram of the automated service provisioning process. The service request issued in step S1 is a user's service request specification with all the necessary attributes of the service such as locations of the service, bandwidth required, protection attributes etc. The service request can be created using a graphical user interface or it can be an XML-formatted input that gets pushed from an external order management system. Other appropriate techniques for creating the service request can also be used.

Once such a service request is received, in step S2, Routing and Wavelength Assignment (RWA) for the requested service is computed. In one embodiment, this function uses Network and Service Inventory information in Telcordia Granite® and the RWA algorithm for this design is implemented as a Design Plugin in Telcordia Assign & Design framework. This Inventory essentially provides complete inventory of the current network as well as services using the network. The network inventory can include network equipment such as DWDM OADMs, ROADMs, Terminal Multiplexers, Amplifiers, Client Service Ports, Transponder Ports, Optical Transport Ports etc. The inventory also has data related to the fiber links and their terminations. Typically this network inventory represents all the DWDM nodes and physical (fiber) connectivity between those nodes. These links are also characterized for the network channel capacity. This inventory also stores the DWDM services data and its relationship/consumption from the network equipment and links. Such a representation enables route computation and channel allocations in the inventive system.

If the RWA processing succeeds, in step S3, it creates the service in the Network and Services Inventory database. As part of this processing in step S3, network resources such as ports, cross-connections, and wavelengths are assigned to the newly created service object in this inventory database.

Once such a service object is ready for activation, in step S4 a flow through activation system processes the service object and the element objects that can be activated, such as cross connections, to automatically activate the service in step S5. In one embodiment, Telcordia Activator can be used to perform flow through activation. The system is also capable of generating manual work instructions for manually assisted flow through activation.

Figure 2:
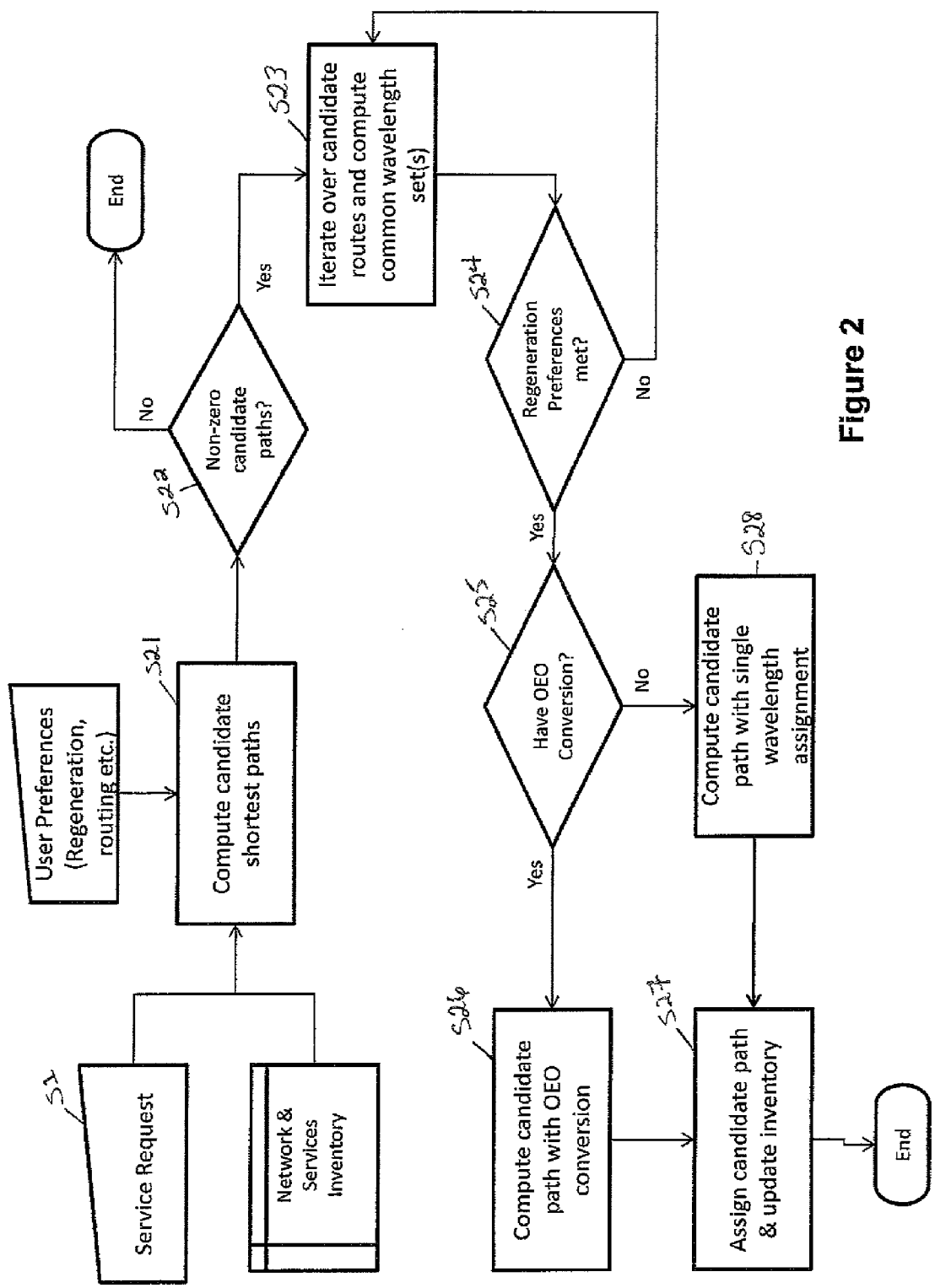
FIG. 2 shows Routing and Wavelength Assignment processing flow.

FIG. 2 shows Routing and Wavelength Assignment processing flow. In step S1, as shown in FIGS. 1 and 2, a service request is created by specifying two network locations, regeneration preferences, wavelength preferences and routing preferences. In step S21, candidate shortest paths are computed, in accordance with the input from step S1, information from the Network and Resource Inventory and user preferences. Routing computation uses a shortest path routing algorithm on such a graph representation of the network and generates a list of candidate routes.

In step S22, if routes are found between the requested service locations (S22=YES), in step S23, each of the candidate routes is used to compute common wavelength set(s). Common wavelength set computation is described in more detail below. Common wavelength set computation also takes into account regeneration preferences. If no routes are found (S22=NO), processing stops.

If common wavelength set(s) meeting the regeneration preferences are found (S24=YES), then the OEO conversion is determined. If a candidate route is not found suitable with respect to regeneration preferences (S24=NO), another candidate route is considered for the service in step S23.

When determining OEO conversion, if the resulting channel assignments have OEO conversions (S25=YES), then route path wavelengths along with transponder pairs at the regeneration sites are computed for the candidate path in step S26. In step S27, a candidate path is assigned and inventory is updated.

If the resulting channel assignments have no OEO conversions (S25=NO), then step S28 computes a candidate with a single wavelength assignment. Processing continues at step S27 where the candidate path is assigned and the inventory is updated.

Figure 3:
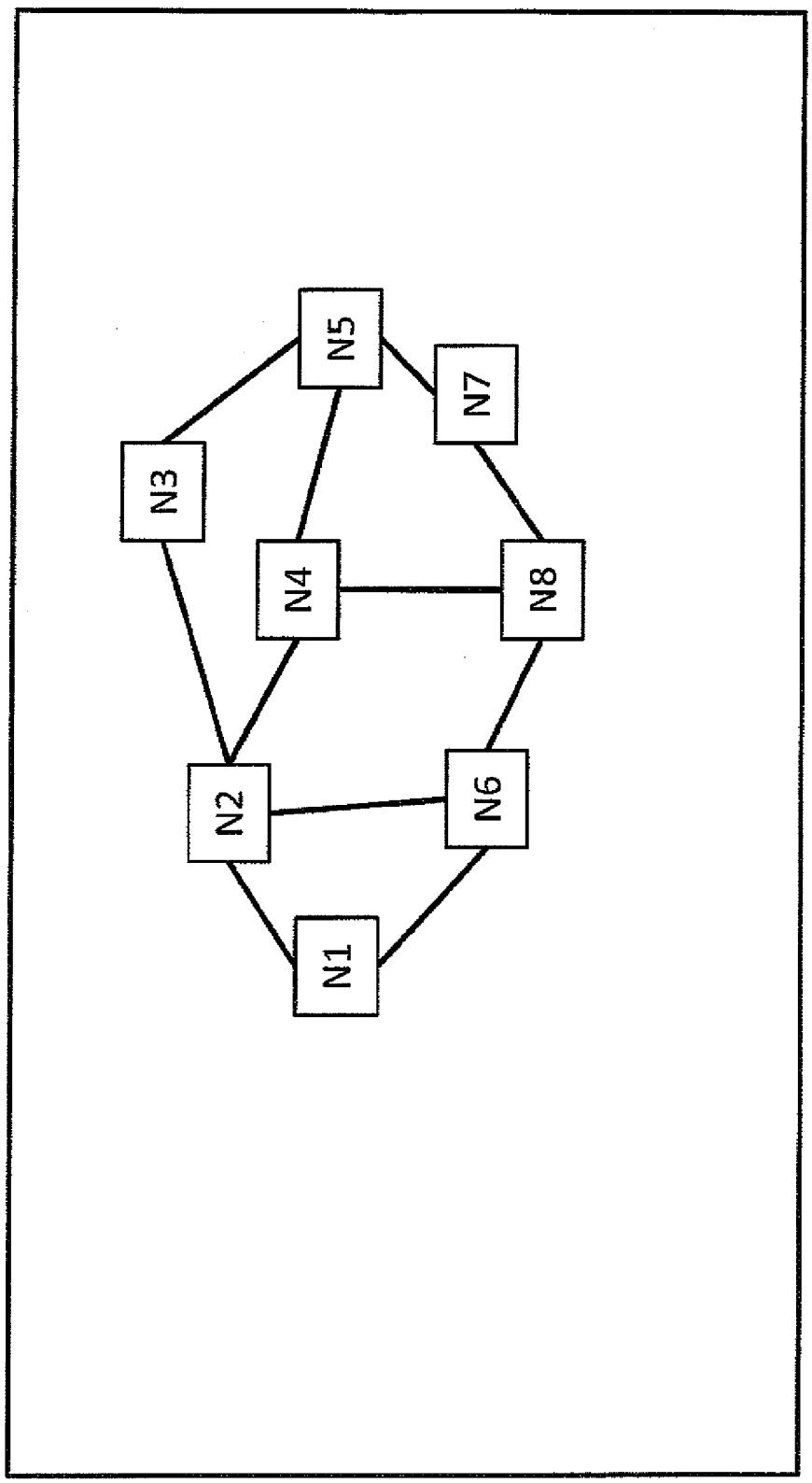
FIG. 3 shows a DWDM Network Representation.

A description of the common channel set computation logic on an example network graph shown in FIG. 3, which is a DWDM Network Representation, is presented.

In FIG. 3, each node (N1 thru N8) represents a collection of DWDM equipment at a location. Such nodes are connected by optical links consisting of fiber optic cables capable of DWDM services. In the inventive methodology presented herein, each DWDM node can be represented by a detailed hierarchy of Container, Shelf, Card and Port objects in the Network and Service Inventory with attributes that determine capabilities and functionality relevant for DWDM services. In one embodiment using Telcordia Granite®, each link is also represented by a Granite Path object. DWDM wavelengths are modeled as Channel objects on the Path object. Each Path object also contains terminating high speed link ports to represent connection between the Nodes that are connected by the optical link.

Each wavelength service on such a network is also represented as a Path object in a Granite® database. Equipment resources such as client ports, transponder ports and wavelength channel object from the optical link paths are also assigned to such service objects.

Assignment of resources to service paths enables the inventive methodology to keep track of available and consumed resources and avoid duplicate assignments.

Figure 4:
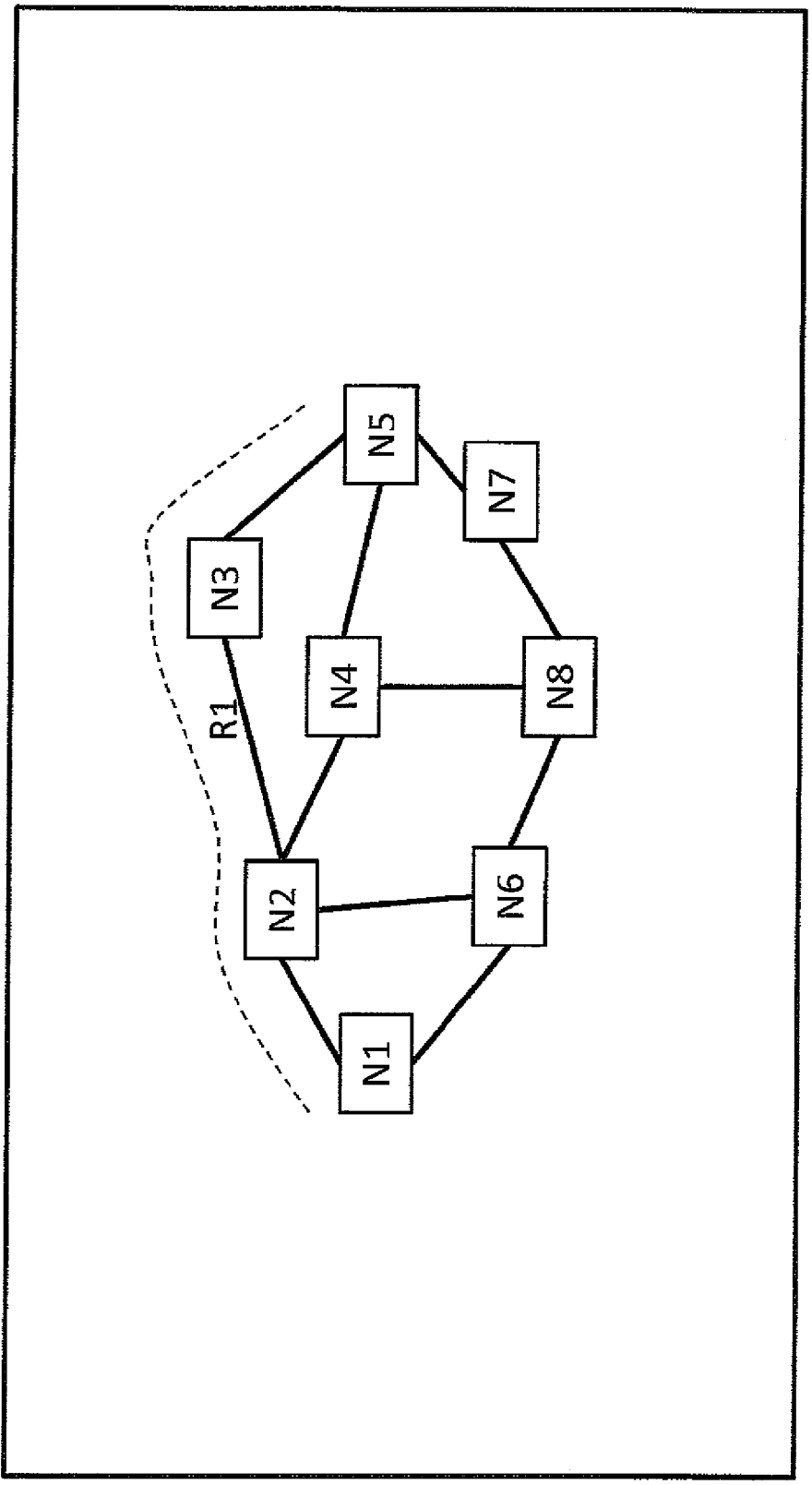
FIG. 4 illustrates service between N1 and N5 of the network shown in FIG. 3.

FIG. 4 illustrates a routing of a service request between nodes N1 and N5 over the example network shown in FIG. 3.

As a first step in the RWA algorithm of the present invention, Network and Service Inventory is queried to create graph representation of the network. After that, shortest path route candidates are computed between N1 and N5. A standard graph centric algorithm such as Djikstra or Bellman-Ford algorithm can be used for computing such route candidates. By default, the inventive methodology uses hop count, e.g., nodes traversed, as the primary weight metric. However, the methodology is generic enough to allow specification of other link weights such as geographic distance, preference for certain route paths, link exclusions, site exclusions, or any other user defined weights to distinctively rank the routes.

Figure 5:
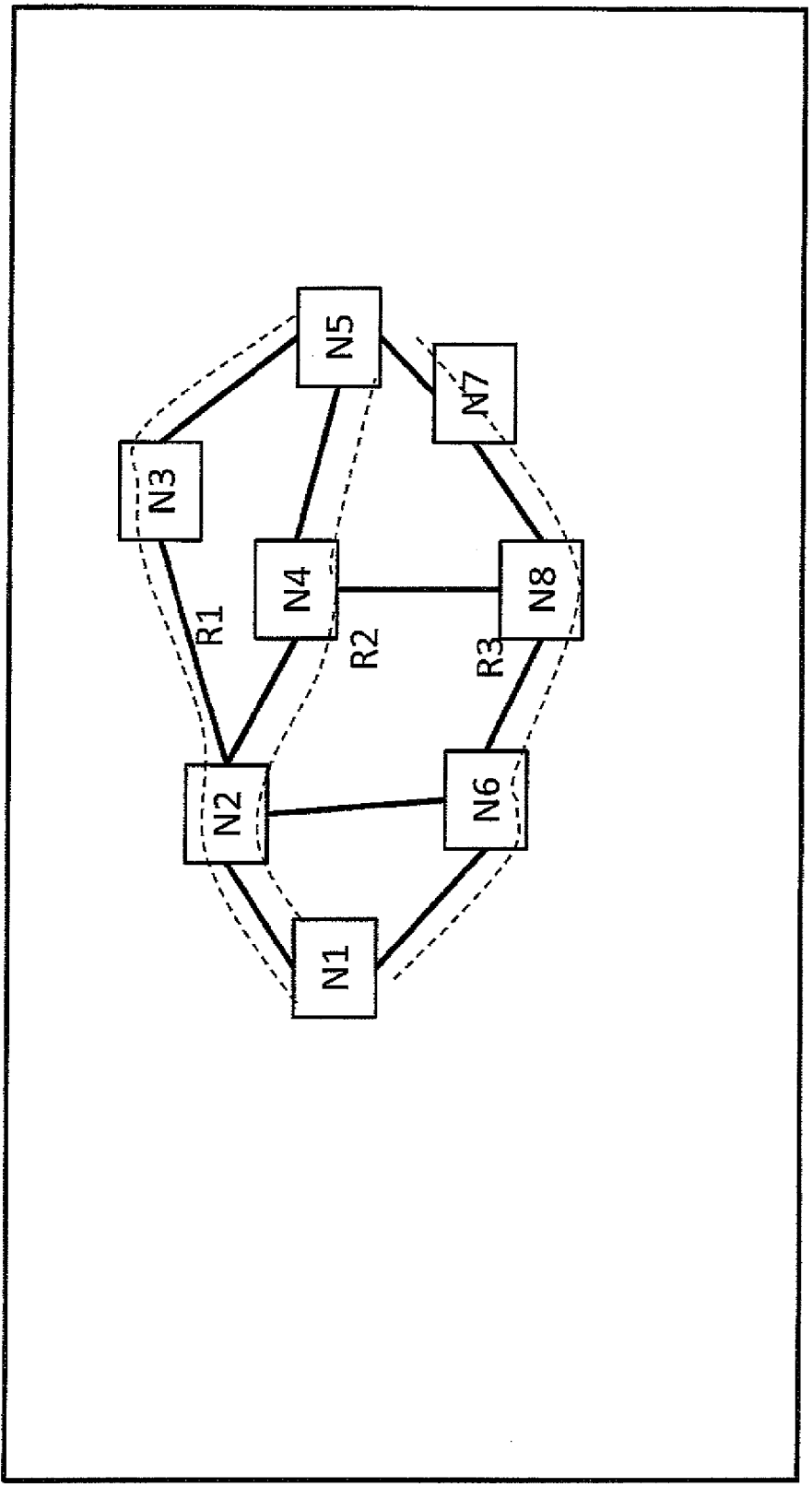
FIG. 5 illustrates candidate routes between nodes of the network shown in FIG. 3.
Figure 6:
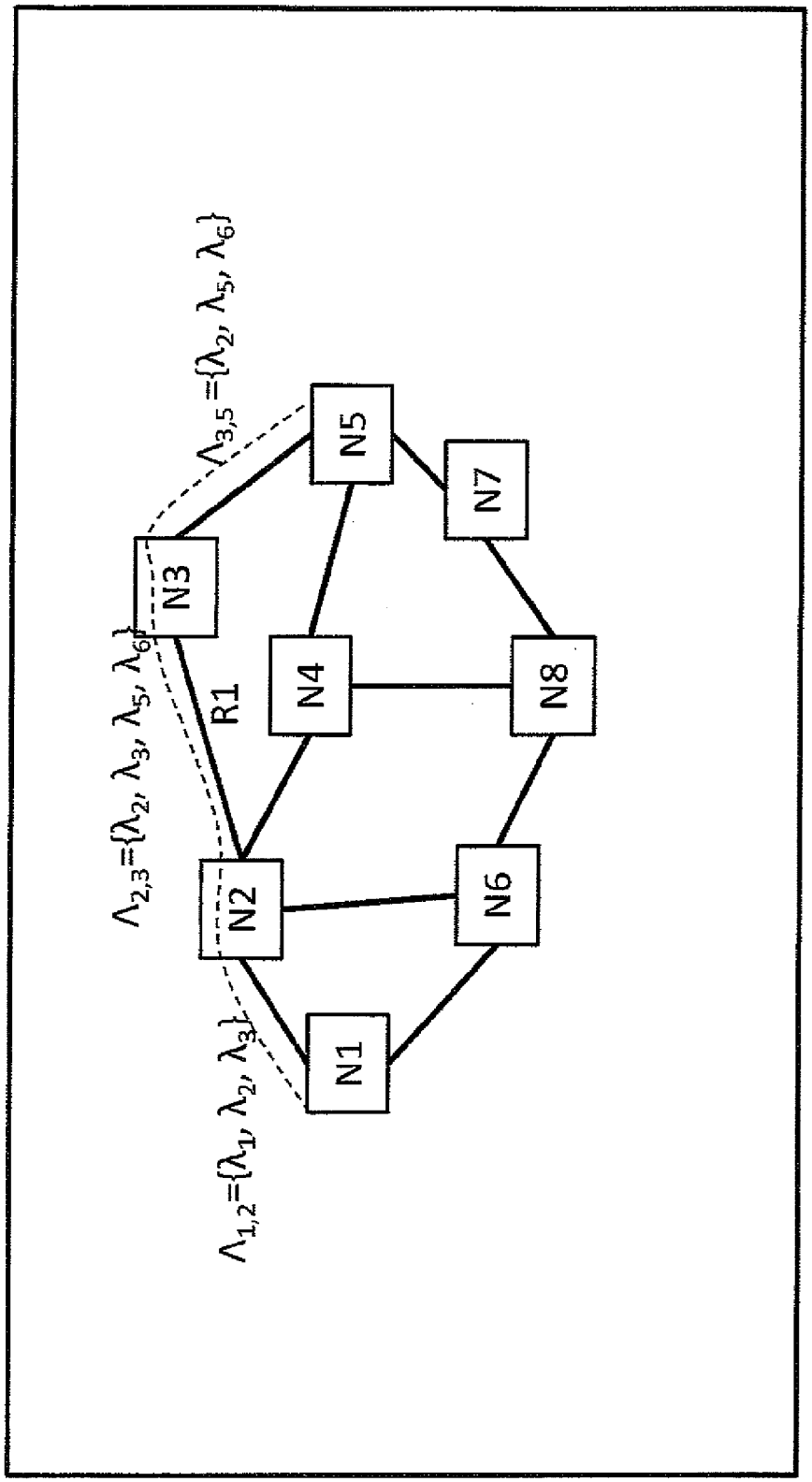
FIG. 6 illustrates available wavelengths on candidate route path R1 shown in FIG. 5.

FIG. 5 illustrates three candidate paths R1, R2 and R3 generated for service between N1 and N5 as shown in the network depicted in FIG. 3. Once the candidate route paths are computed, each route path, in the order of its ranking, is evaluated for wavelength availability for the service request. Any channel that is already assigned to another service is not available for this newly requested service. Representing the channel assignment to service paths in the database enables this computation. For example, FIG. 6 shows the available wavelengths on each route section of the first candidate route R1. As shown in FIG. 6, on route section $N_1$-$N_2$, wavelengths $\lambda 1$, $\lambda 2$ and $\lambda 3$ are available, on route section $N_2$-$N_3$, wavelengths $\lambda 2$, $\lambda 3$, $\lambda 5$, and $\lambda 6$ are available, and on route section $N_3$-$N_5$, wavelengths $\lambda 2$, $\lambda 5$, and $\lambda 6$ are available.

In general, the inventive methodology attempts to find a single wavelength for the longest possible section of the route. If a single wavelength can be used end to end, it is the most cost effective way to provision the service. This is because change of wavelength requires Optical to Electrical and back to Optical (OEO) conversion of the signal which requires corresponding OEO equipment (transponders) at the node where such conversion needs to be applied. By minimizing the OEO conversions on the shortest possible path between two service nodes, the novel algorithm minimizes resource (wavelength) utilization while keeping the equipment costs down.

Figure 7:
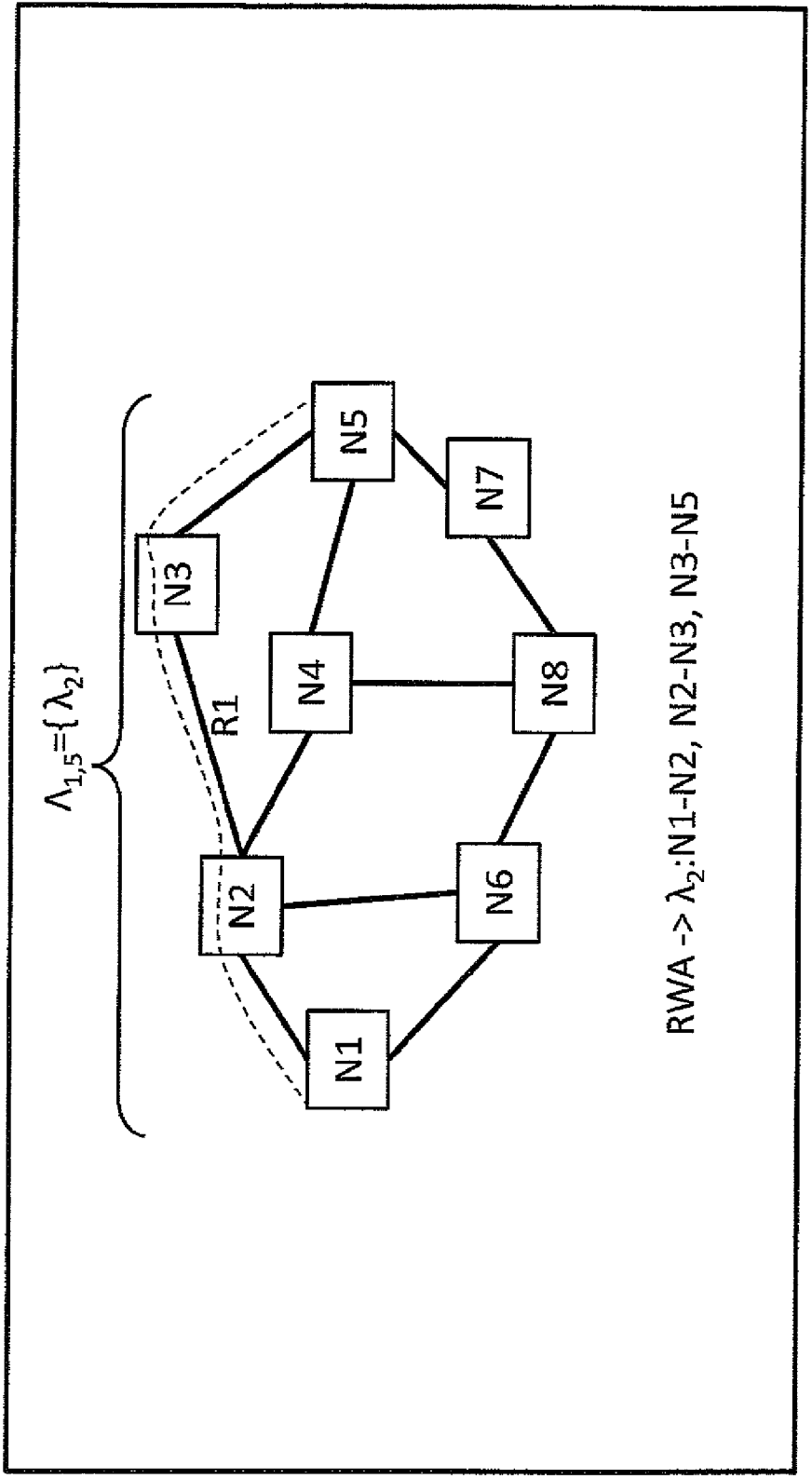
FIG. 7 shows common channel set computation with no regeneration required.

FIG. 7 illustrates common channel set computation with no regeneration required. As FIG. 7 shows, using this algorithm, a common wavelength set $\{\lambda 2\}$ is found for the route path R1 for the example shown in FIG. 6.

Figure 8:
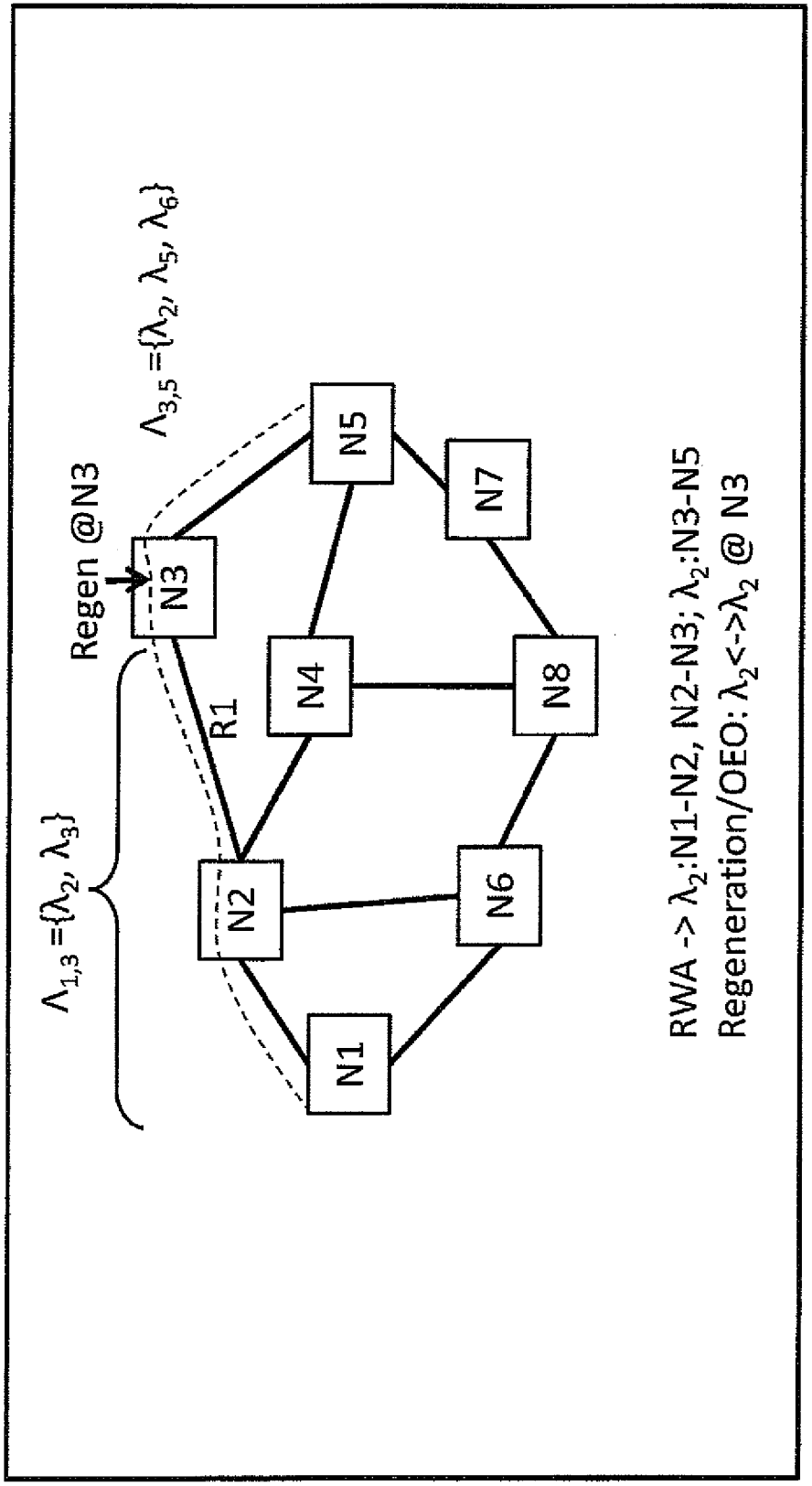
FIG. 8 shows common channel sets with OEO Regeneration at N3.

Communication service providers also use regeneration nodes when optical links have to go over long distances. The novel algorithm allows users to specify such regeneration nodes as designated OEO node(s). For example if node $N_3$ was one such designated OEO node, multiple common channel sets are computed as shown in FIG. 8. In this case, channels $\lambda 2$ and $\lambda 3$ are available on route section $N_1$-$N_3$ and channels $\lambda 2$, $\lambda 5$ and $\lambda 6$ are available on route section $N_3$-$N_5$.

Figure 9:
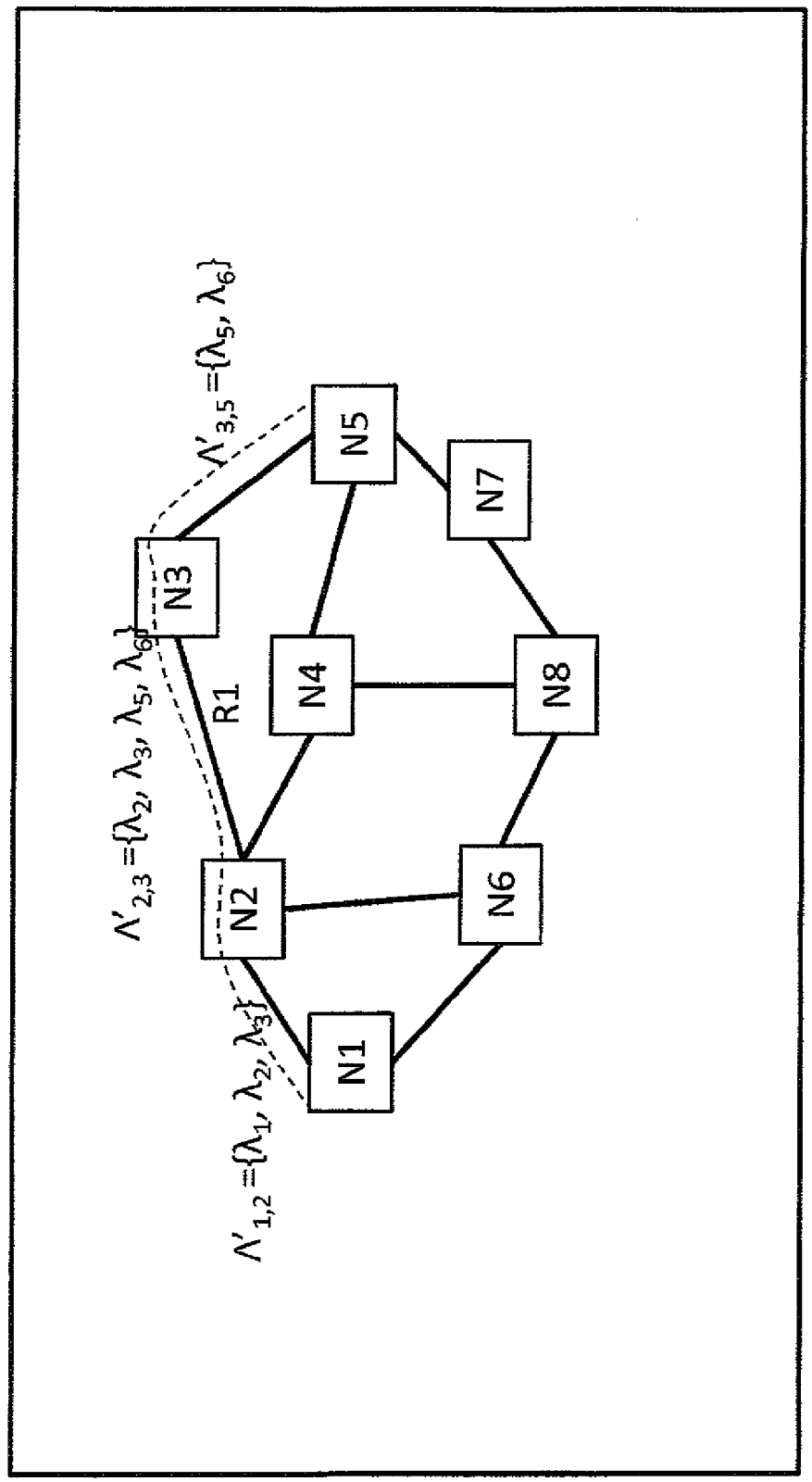
FIG. 9 shows an example where no common channel exists end to end.
Figure 10:
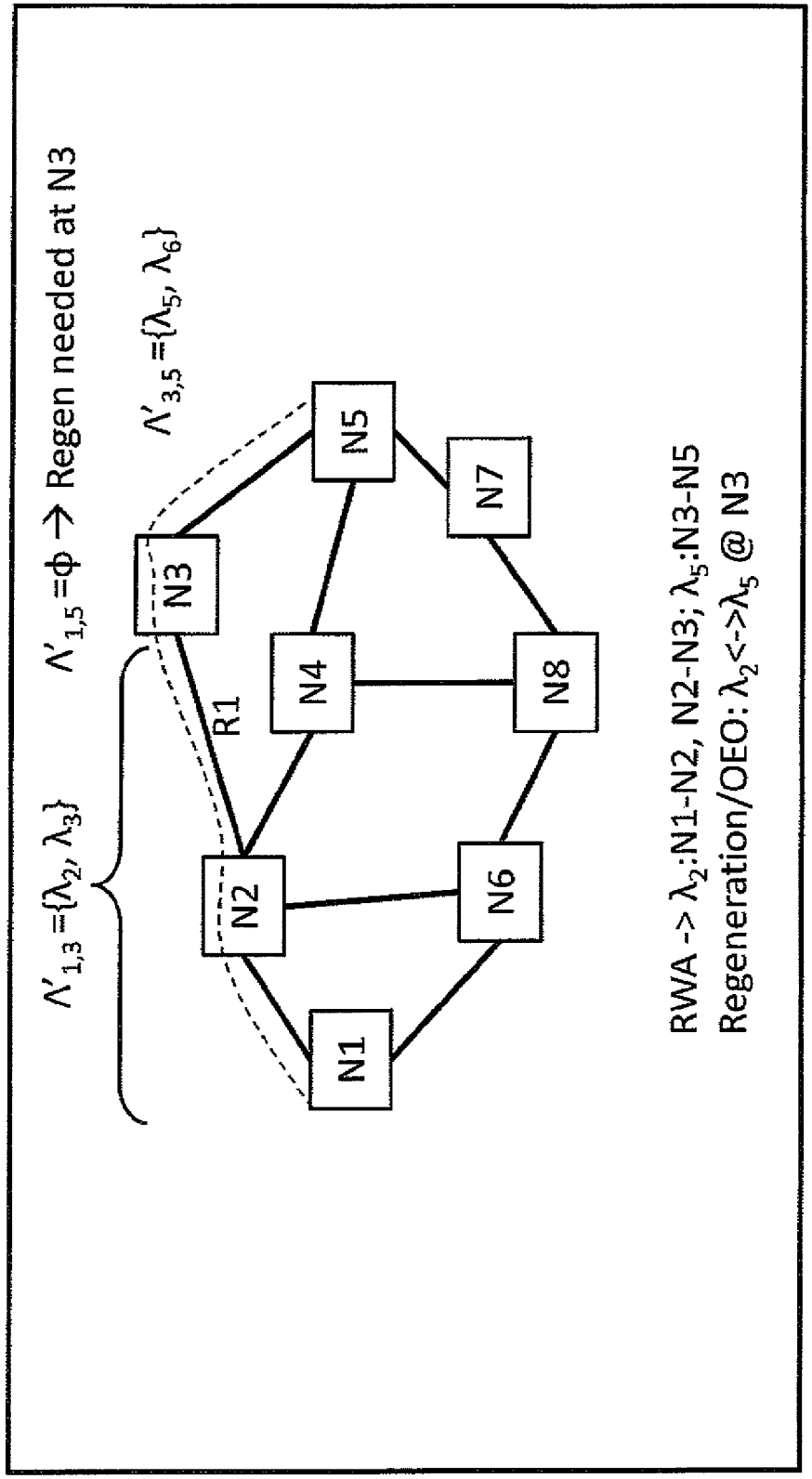
FIG. 10 shows OEO node determination based on common channel set computations.

On the other hand, in the situation where no single common channel can be found for a given route, the inventive algorithm can determine the fewest OEO nodes required for the service. FIGS. 9 and 10 show such a case where $N_3$ is determined to be a required OEO node.

Moreover, channel assignments and protection route path computations are performed as follows. If a candidate route path is found with non-empty common channel set(s), the route paths and the first, e.g., lowest numbered, wavelength in the corresponding common channel set are assigned to the service. If protected service is desired, a diversified route and channel computation can be carried out over the network by excluding the selected working route paths and intermediate sites. The processing logic for protection route and wavelength selection can be the same as that is used for working route and wavelength assignment.

The novel wavelength channel selection on DWDM route path algorithm is described with reference to FIGS. 11-18.

For a given route path, the objective of channel selection algorithm is to find the channels along the route that result in the fewest OEO conversions.

Let N be a set of nodes $N_1$ thin $N_k$ along the route R.

$$N = \{N_1, N_2, N_3, \ldots, N_k\}$$

Let $\Lambda_{i,j}$ be a set of common available channels (wavelengths) between nodes $N_i$ and $N_j$. This set represents the wavelengths that can be used without requiring OEO conversion at any intermediate nodes between $N_i$ and $N_j$.

$$\Lambda_{i,j} = \{C_1, C_2, C_3, \ldots, C_l\}$$

For adjacent node pairs, $\Lambda$ represents all unused wavelengths that also take into consideration other equipment constraints that may exist. For example, at circuit termination and OEO conversion nodes, it is desirable to use wavelengths that are supported by the existing transponders. As a result, when computing $\Lambda$ for such links, the channel set is filtered to have only the unused channels that are supported by the equipment.

Figure 11:
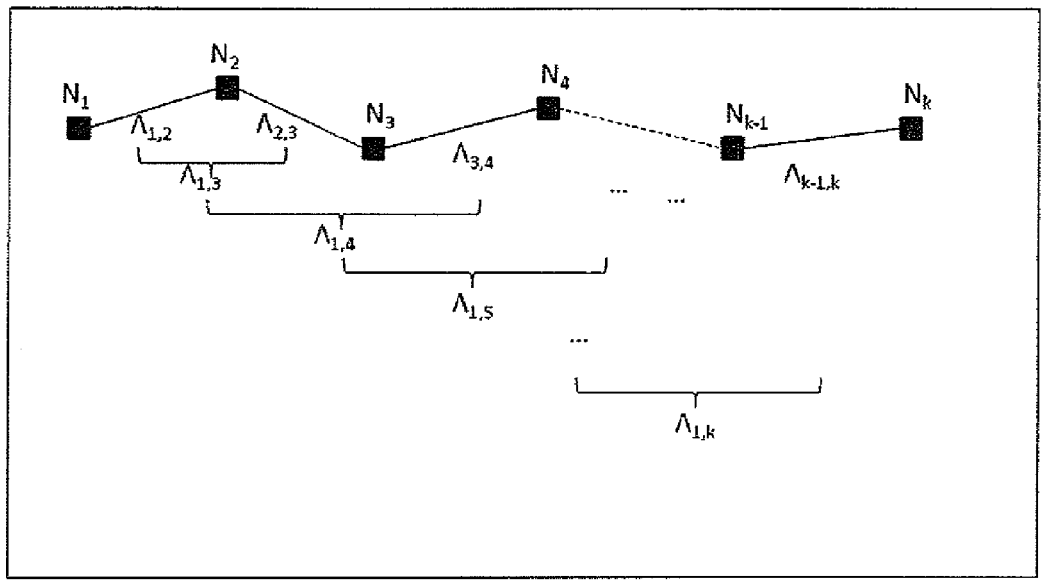
FIG. 11 illustrates the inventive successive common channel set computation.

First a simple common channel set computation algorithm is presented. This algorithm basically computes common channels sets by successive set intersections for available channel sets as shown in FIG. 11 and the following equations.

$$\Lambda l, n = \Lambda l, m \cap \Lambda m, n; \text{ where, } l < m < n \qquad (1)$$

$$\text{And } \Lambda l, m \cap \Lambda m, n = \Phi \rightarrow Nm = \text{OEO node} \qquad (1')$$

In general, common channel set along the route is computed using the equation below:

$$\Lambda 1, k = \Lambda 1, 2 \cap \Lambda 2, 3 \cap \square \cap \Lambda k-1, k \qquad (2)$$

Figure 12:
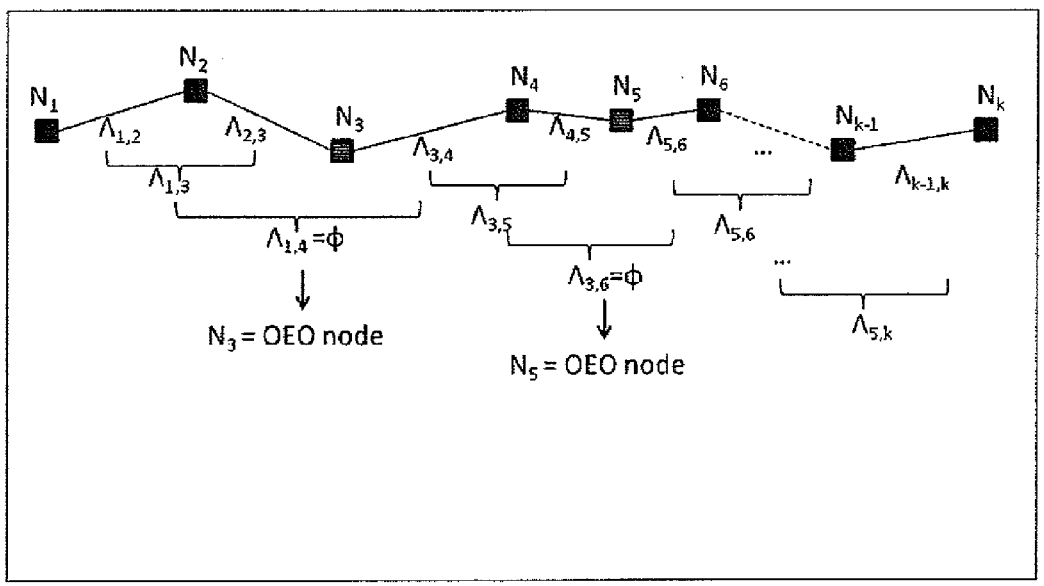
FIG. 12 shows OEO nodes determination using the successive common channel set algorithm.

As (1') indicates, OEO nodes are determined when the successive computation of $\Lambda_{i,j}$ results in the empty set. FIG. 12 shows an example where $N_3$ and $N_5$ are determined to be OEO nodes using this logic.

However, it should be noted that if successive common channel selection is carried out backward from $N_k$ node to $N_l$, it is possible that $\Lambda_{4,k}$ is found to be a non-empty set. Thus there exists more than one possible common channel set or even longer sections of common channel sets that are available on the same route path depending upon the starting point of the calculations.

It can be seen that successive common channel set computation (2) determines the minimum number of OEO conversions needed. This follows from the fact that no matter how the common channel sets are computed, a non-empty common channel set cannot span a whole common channel section computed in the manner above.

If $\Lambda i,j \cap \Lambda j,k = \Phi$, where $i<j<k$

It follows that for $l \leq i, k \leq m$ $\Lambda l,m = \Phi$

However, in some situations it is important to consider other possible OEO nodes. Some of those considerations are: to use common channel on the longest span possible, to consider node capacity for OEO conversions, including availability of transponders, and/or to find a higher channel availability section to reduce the probability of channel exhaustion on certain route sections.

In order to determine all possible common channel section combinations, a pair-wise common channel set algorithm can be used. For a set of links between nodes $N_i$ and $N_j$ that form a contiguous subset of the route R, $\Lambda_{i,j}$ can be computed by successive pair wise intersection of available channel set $\Lambda$ on each of the links of the subset.

Figure 13:
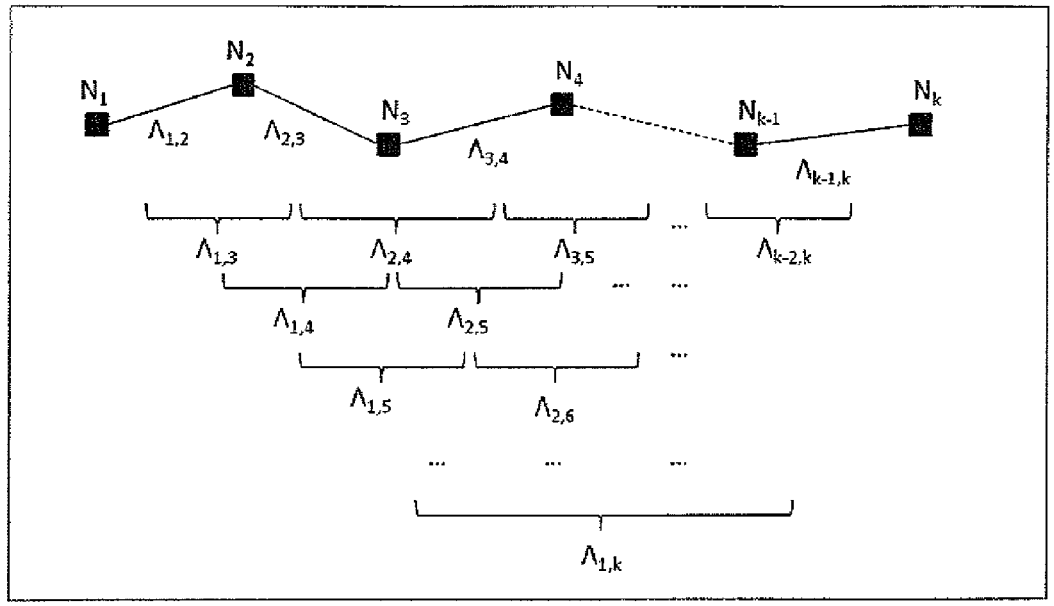
FIG. 13 shows pair-wise common channel computation.

As shown in FIG. 13, a pair-wise computation of common channels is carried out by using set intersection of available channels for the links and successive common channel sets. The computation forms a hierarchy of set intersection calculations. For a k node route, this involves (k*(k−1)/2) set intersections. Computationally it is considerably more expensive compared to (2) above which requires (k−1) set intersections.

If any $\Lambda_{i,j}$ becomes an empty set ($\phi$), all subsequent intersections will be empty sets too. In these cases, the algorithm could be optimized to stop computing common channel sets that involve that particular $\Lambda_{i,j}$.

Also, $\Lambda l,n = \Lambda l,m \cap \Lambda m',n$; where, $l<m'<m<n$ \hfill (3)

For such a case,

79 $l,m \cap \Lambda m',n = \Phi \rightarrow$ OEO node is somewhere between $Nm'$ and $Nm$ nodes Thus, equation (3) is a more general form of the computation (1) above.

Figure 14:
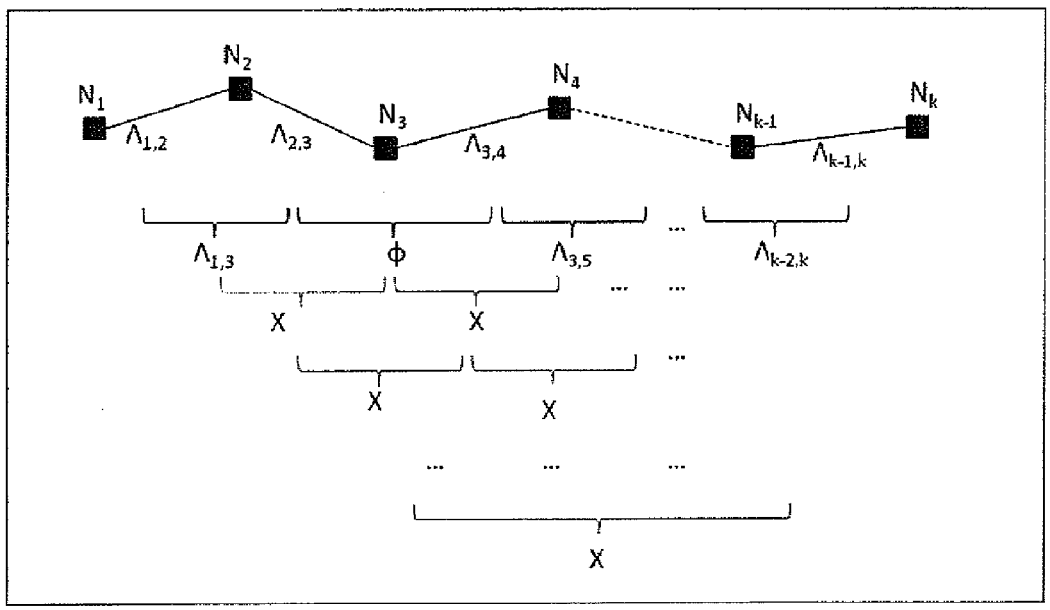
FIG. 14 shows OEO node determination based on pair-wise common channel computation.
Figure 15:
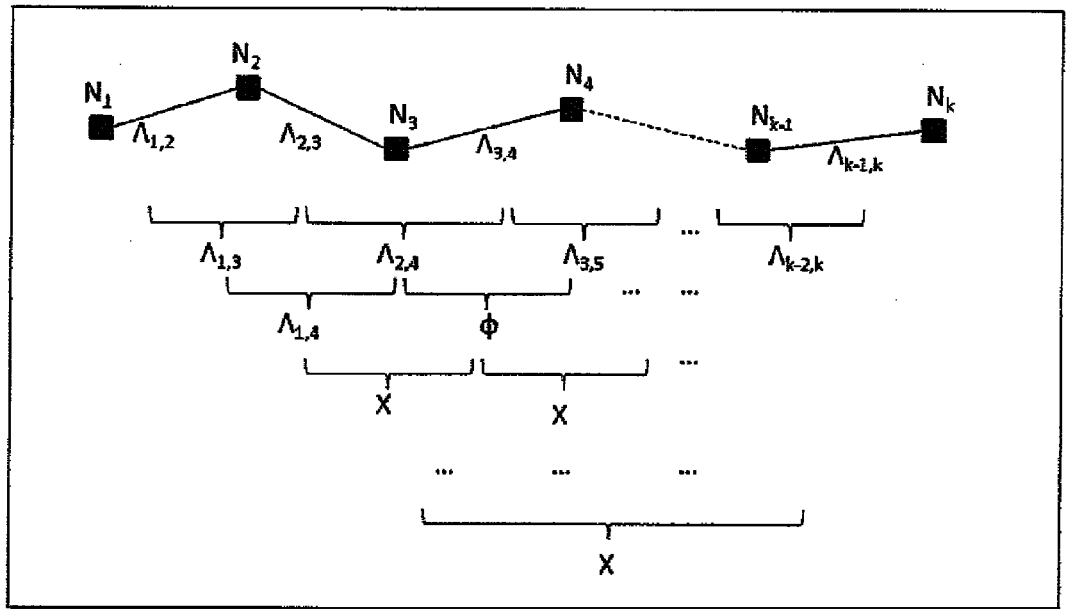
FIG. 15 is an example of multiple channel selection choices.

In the example shown in FIG. 14, $N_3$ needs to have OEO conversion. The example in FIG. 15 indicates that either node $N_3$ or $N_4$ could perform OEO conversion.

It is typically desired to have the minimum number of OEO conversions. In order to accomplish that, all the common channel sets are computed as indicated above. Then each set is given a rank order from the longest to the shortest route spans covered (length is typically in terms of the hop count). The channel set that is empty is given rank of 0.

Let, $\rho$=rank of $\Lambda i,j$ $\rho = j-i$; if $\Lambda i,j \neq \Phi$ $\rho = 0$; if $\Lambda i,j = \Phi$ It should be noted that one could use other considerations, such as number of common channels in $\Lambda_{i,j}$, availability of OEO function at two ends of the route section, etc., in computation of the rank. In one embodiment, the simple rank value is chosen, as discussed above, to achieve the longest possible optical pass through sections.

Let S be a sorted set of all the common channel sets ($\Lambda$) computed in descending rank order. In order to balance the channel utilization, when two or more common channel sets have the same rank order, the channel set with more channels is placed in S before the other set(s).

Let C be a set of selected channel sets.

Let $\alpha$ be the left node index of C and $\beta$ the right node index of C.

The channel set selection algorithm in one embodiment can be implemented as follows:

```
C = φ;
SELECT the first Λ_{i,j} from S;
INSERT Λ_{i,j} in to C;
α=i; β = j;
WHILE (α ≠l AND β ≠k)
{
    REMOVE all Λ_{m,n} from S such that either α<m<β OR α<n<β ;
    SELECT the first Λ_{i,j} from remaining S;
    IF i< α THEN
        α=i;
    IF j> β THEN
        β=j;
}
FOR every Λ_{i,j} in C
{
    SELECT the first channel λ; /* NOTE: This is the channel
selected between nodes Ni and N_j
}
```

Figure 16:
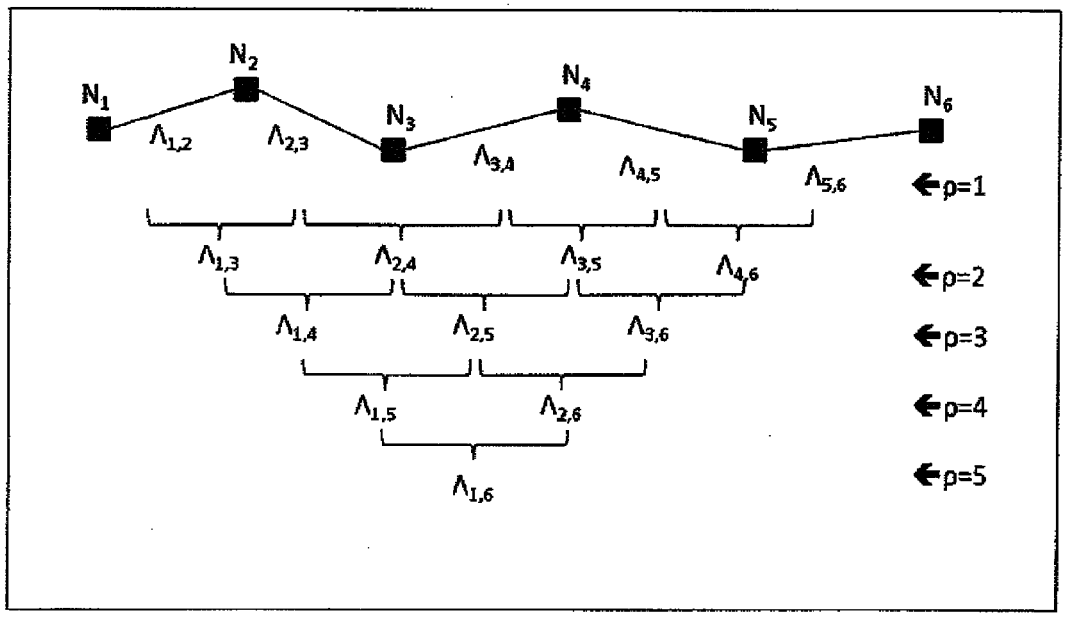
FIG. 16 is illustrates the rank (p) concept for computed common channel sets.

FIG. 16 shows end to end channel being available.

Figure 17:
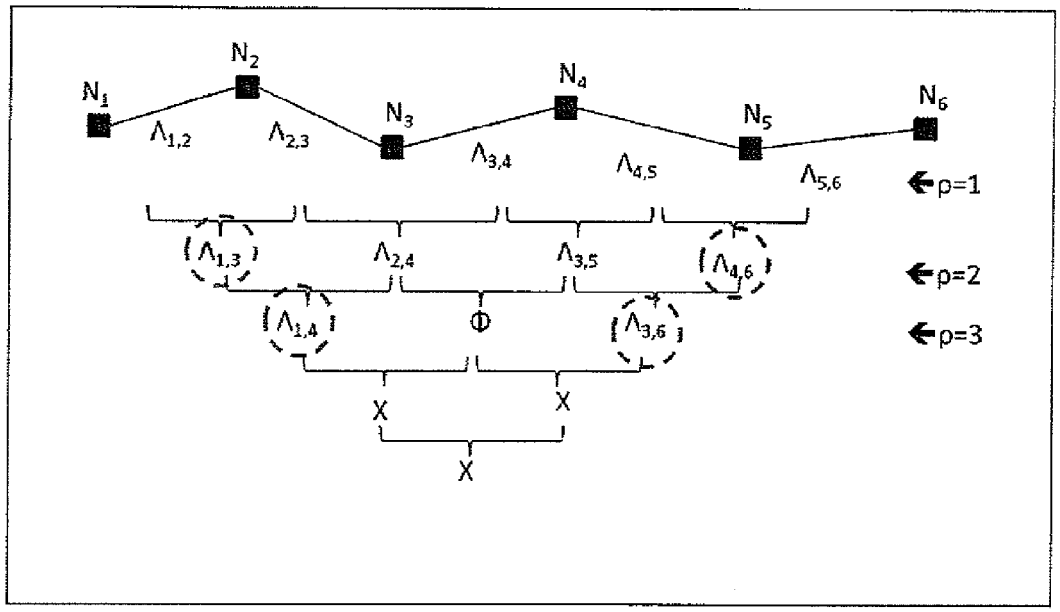
FIG. 17 shows OEO node choices at N3 or N4 based on the rank ordering of the non-empty common channel sets.

If the channel selection algorithm is applied to the example shown in FIG. 17, $\Lambda_{1,4}$ and $\Lambda_{3,6}$ will be the top ranked ($\rho$=3) common channel sets. If $\Lambda_{1,4}$ happened to be the first member in the set S, $\Lambda_{1,4}$ and $\Lambda_{4,6}$ will be selected in C. In this case $N_4$ is the OEO node. Alternatively, $\Lambda_{3,6}$ and $\Lambda_{1,3}$ could also be chosen as the selected common channel sets, with $N_3$ being the OEO node. For the last step of channel selection, one channel each from selected common channel sets in C is assigned to the service.

In certain circumstances, communication service providers designate certain network nodes as designated OEO nodes. At such nodes OEO conversion is done in any case. Such a scenario presents greater flexibility in wavelength selection.

The inventive approach enables handling of pre-specified OEO nodes. FIG. 17 shows an example where $N_4$ is a designated OEO node.

Figure 18:
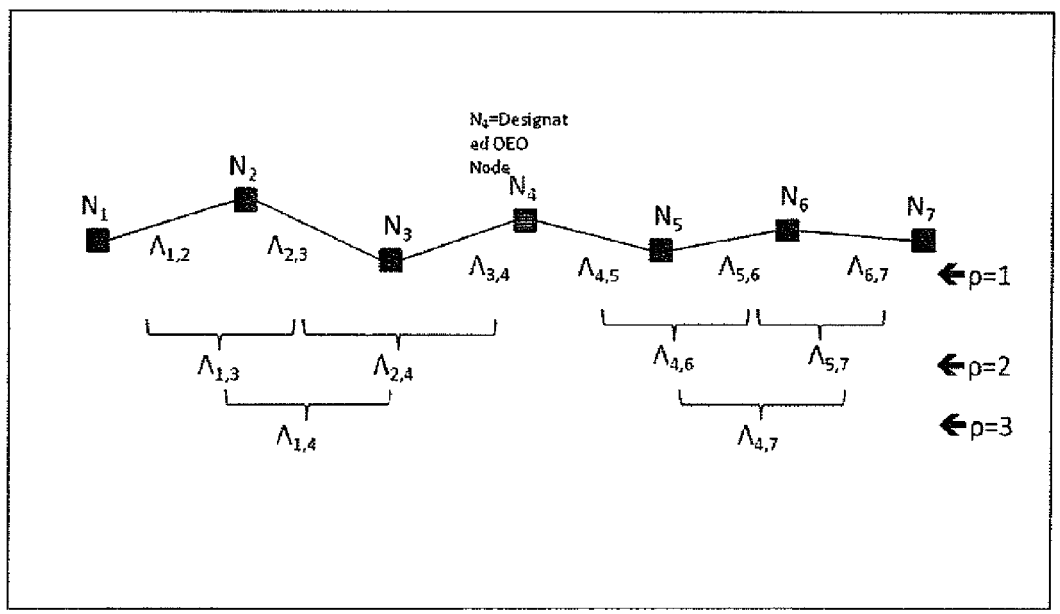
FIG. 18 shows applicability of channel selection algorithm with designated OEO node.

As depicted in the example above, the algorithm for channel selection splits the route path into multiple route path sections and applies channel selection logic described above to individual route path sections. FIG. 18 shows such channel selection with designated OEO nodes.

By computing route path candidate and the common channel sets in a single step iterative algorithm the following objectives can be satisfied: a) Minimize the wavelength used for the service using the shortest possible path, b) Minimize the OEO equipment needed, and thereby reduce the cost of the service, c) Satisfy signal regeneration requirements by accepting designated OEO regeneration node in the computation algorithm d) Allow additional constraints on routing such as route preferences or exclusions. This gives additional operational controls to communication services providers in how the DWDM network is utilized. Optimize protection route and wavelength assignment computation.

Various aspects of the present disclosure may be embodied as a program, software, or computer instructions embodied or stored in a computer or machine usable or readable medium, which causes the computer or machine to perform the steps of the method when executed on the computer, processor, and/or machine A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a CPU, a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for automated provisioning of services in DWDM networks, comprising steps of:

obtaining a service request comprising at least a desired service and preferences;
performing, using a CPU, a routing and wavelength assignment algorithm in accordance with a network and services inventory;
creating the desired service in the inventory based on results of the routing and wavelength assignment algorithm;
processing the desired service; and
activating the desired service in the DWDM network,
said routing and wavelength assignment algorithm comprising steps of:
 computing an ordered list of shortest candidate routes;
 iterating over the ordered list of shortest candidate routes to assign resources along the first route that meet regeneration and OEO preferences further comprising steps of:
  computing common wavelength sets using hierarchical pair-wise common channel set algorithm;
  computing required OEO regenerations;
  selecting optimal OEO regeneration nodes using rank order of the common channel sets, while considering availability of required transponder ports at the optimal OEO regeneration nodes;
  selecting wavelengths from common channel sets on route path sections;
  selecting termination and OEO node transponder ports;
  assigning selected wavelengths on the candidate route paths;
  assigning transponder ports; and
  updating the network and services inventory.

2. The method according to claim 1, wherein the preferences comprise at least one of network locations, regeneration preferences, wavelength preferences and routing preferences.

3. The method according to claim 1, wherein the resources are one or more of wavelengths and client ports and transponder ports.

4. A system for automated provisioning of services in DWDM networks, comprising:
a CPU; and
a module operable to obtain a service request comprising at least a desired service and preferences, to perform a routing and wavelength assignment algorithm in accordance with a network and services inventory, to create the desired service in the inventory based on results of the routing and wavelength assignment algorithm, to process the desired service, and to activate the desired service in the DWDM network, the routing and wavelength assignment algorithm performed by computing an ordered list of shortest candidate routes, iterating over the ordered list of shortest candidate routes to assign resources along the first route that meets regeneration and OEO preferences by computing common wavelength sets using hierarchical pair-wise common channel set algorithm, computing required OEO regenerations, selecting optimal OEO regeneration nodes using rank order of the common channel sets, while considering availability of required transponder ports at the optimal OEO regeneration nodes, selecting wavelengths from common channel sets on route path sections, selecting termination and OEO node transponder ports, assigning selected wavelengths on the candidate route paths, assigning transponder ports, and updating the network and services inventory.

5. The system according to claim 4, wherein the preferences comprise at least one of network location, regeneration preferences, wavelength preferences and routing preferences.

6. The system according to claim 4, wherein the resources are one or more of wavelengths and client ports and transponder ports.

7. A non-transitory computer readable storage medium storing a program of instructions executable by a machine to perform a method for automated provisioning of services in DWDM networks, comprising:
- obtaining a service request comprising at least a desired service and preferences;
- performing, using a CPU, a routing and wavelength assignment algorithm in accordance with a network and services inventory;
- creating the desired service in the inventory based on results of the routing and wavelength assignment algorithm;
- processing the desired service; and
- activating the desired service in the DWDM network,
- said routing and wavelength assignment algorithm comprising steps of:
  - computing an ordered list of shortest candidate routes;
  - iterating over the ordered list of shortest candidate routes to assign resources along the first route that meet regeneration and OEO preferences further comprising steps of:
    - computing common wavelength sets using hierarchical pair-wise common channel set algorithm;
    - computing required OEO regenerations;
    - selecting optimal OEO regeneration nodes using rank order of the common channel sets, while considering availability of required transponder ports at the optimal OEO regeneration nodes;
    - selecting wavelengths from common channel sets on route path sections;
    - selecting termination and OEO node transponder ports;
    - assigning selected wavelengths on the candidate route paths;
    - assigning transponder ports; and
    - updating the network and services inventory.

8. The non-transitory computer readable storage medium according to claim 7, wherein the preferences comprise at least one of network location, regeneration preferences, wavelength preferences and routing preferences.

9. The non-transitory computer readable storage medium according to claim 7, wherein the resources are one or more of wavelengths, client ports and transponder ports.

* * * * *

UNITED STATES PATENT AND TRADEMARK OFFICE
CERTIFICATE OF CORRECTION

PATENT NO. : 8,768,167 B2
APPLICATION NO. : 13/284044
DATED : July 1, 2014
INVENTOR(S) : Tanna et al.

It is certified that error appears in the above-identified patent and that said Letters Patent is hereby corrected as shown below:

In the Specification

Column 1, Line 12, delete "herein" and insert -- herein. --, therefor.

Column 1, Line 47, delete "Dynamic" and insert -- Dynamic. --, therefor.

Column 3, Line 45, delete "is illustrates" and insert -- illustrates --, therefor.

Column 5, Line 37, delete "Djikstra" and insert -- Dijkstra --, therefor.

Column 7, Line 49, delete "$79\ l,m \cap \Lambda m',n = \Phi \rightarrow OEO$" and insert -- $\Lambda l,m \cap \Lambda m',n = \emptyset \rightarrow OEO$ --, therefor.

Column 9, Line 8, delete "machine" and insert -- machine. --, therefor.

Signed and Sealed this
Fourteenth Day of October, 2014

Michelle K. Lee
*Deputy Director of the United States Patent and Trademark Office*